Jan. 10, 1956 — O. WALDRICH — 2,730,022
PLANING MACHINES
Filed May 15, 1951 — 3 Sheets-Sheet 1

Inventor
O. Waldrich

Jan. 10, 1956  O. WALDRICH  2,730,022
PLANING MACHINES
Filed May 15, 1951  3 Sheets-Sheet 3
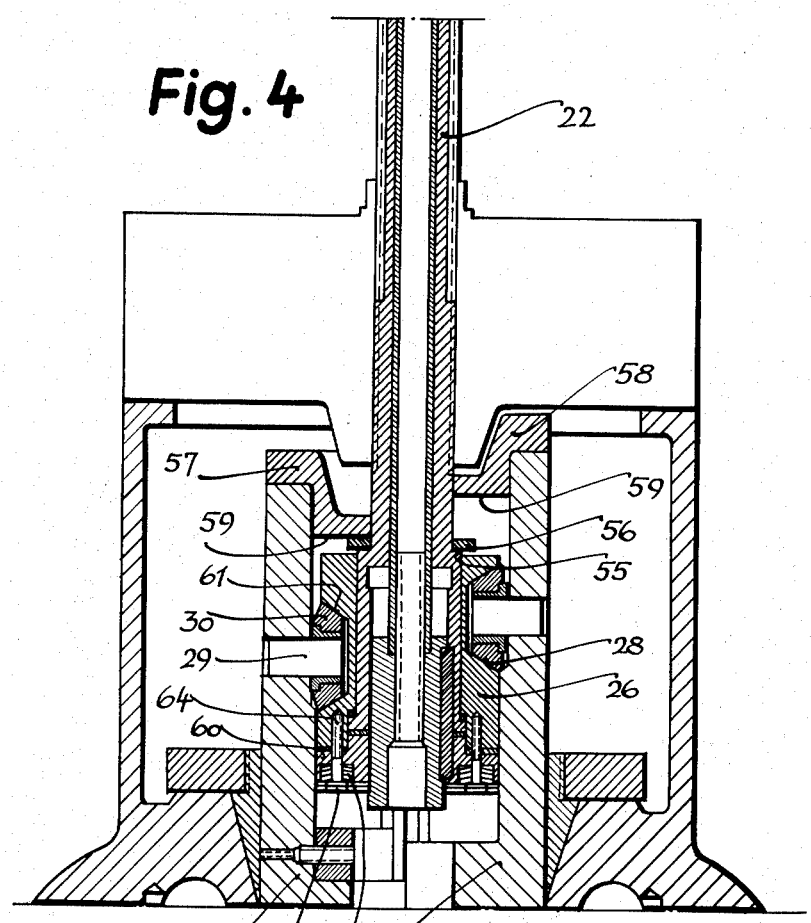
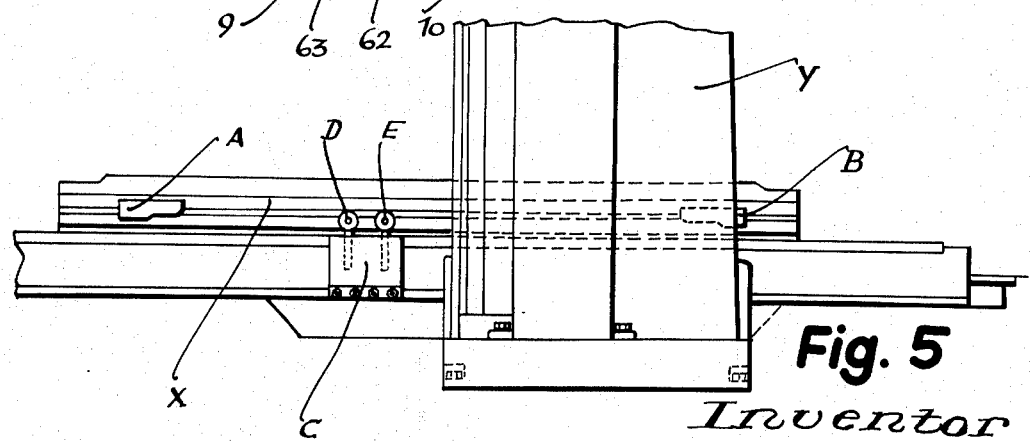
Inventor
O. Waldrich
By Stewart Downing Reebell
Attys.

United States Patent Office 2,730,022
Patented Jan. 10, 1956

2,730,022

PLANING MACHINES

Oskar Waldrich, Werthenbach, Germany

Application May 15, 1951, Serial No. 226,382

Claims priority, application Germany May 17, 1950

10 Claims. (Cl. 90—53)

This invention relates to planing machines of the type used for planing metals and like hard materials which enable the return stroke of the work-table to be used, that is in which cutting is effected in both directions of movement of the table.

Numerous proposals to this end were made long ago but none of them came into general use, and further proposals have not been made in recent times. The explanation is that in earlier times the cutting speeds and depth of cut were comparatively small and consequently the loads were low. The tool steels used were, with the working materials planed, not very sensitive to chatter. Nevertheless even in those times the proposals for two-way cutting proved too complicated or too delicate. The use of carbide tools, the multifold increase in cutting speeds and depth of cut and the high sensitivity of carbide tools to the slightest chatter took the whole idea of using both strokes for cutting still further away from the realms of practical possibilities.

The present invention proposes a new arrangement which, as practical experience has shown, satisfies all the requirements imposed on the machine. The arrangement according to the invention comprises a series of features which are in part known per se but have not previously been used in combination. One essential feature is that it comprises two tool carrying rams which moving in the general direction of the tool shank are alternately moved one away from and the other towards the work piece so that the ram advanced towards the work piece holds the tool carried thereby in the working position. At the end of each working stroke of the table the position of the two rams is reversed and at the same time both rams are rotated through 180° about a longitudinal axis, the tools themselves being secured laterally to the rams so that, ignoring the feed, the tool for the one direction of movement of the table after the rotation occupies the same position as that which acted in the previous direction of movement but facing the opposite way.

It has indeed been proposed to arrange two tool-carrying rams side by side and move them up and down alternately. But it was not proposed to rotate the rams. It has also been proposed to mount the tool rotatably on its longitudinal axis and to rotate it through 180° at the end of each stroke of the table. The former arrangement presupposes slender tools so that their eccentricity does not matter too much, the latter only enables a single tool to be used, which as will be shown later, is a disadvantage.

The major fault of both these prior proposals was however the absence of a further feature of the present invention, which is indispensible in combination with the above stated ram arrangement, namely that each time after the rotation, that is during the whole cutting period, the rams must be rigidly clamped in a reliable manner. This feature is missing from all hitherto proposed arrangements with a movable tool.

The two rams will obviously be placed closely side by side in order to keep the mechanism as small as possible. Also the tools will be mounted on the outside of the rams, that is out of centre so that they can be used not only on horizontal, but also on vertical surfaces. The cutting edges of the tools must then project laterally beyond the rams.

Practical tests with the arrangement according to the invention have shown that it is now for the first time possible to use a plurality of tools one behind the other in planing machines so that during one stroke a series of relatively staggered tools come into action one shortly after another and take a corresponding number of cuts as is often done in lathes. This arrangement can be considerably simplified and improved if as is now proposed according to the invention, a plurality of tools are not arranged behind one another in relatively staggered formation, but so that when the angle of rotation of 180° described above, which is the normal for a single tool, they are directly in line one behind another. If now rotation is effected not through 180° but for example through a somewhat greater angle, the tools automatically take a staggered formation in relation to the direction of movement of the table. This staggering and thus the chip widths cut by the several tools and the total necessary feed resulting from the number of tools and the chip widths, can be adjusted by adjusting the excess over 180°. The tools must be ground with angles which allow for this or permit certain variations in relation to the direction of movement of the table.

An example which embodies the invention and by reference to which further developments will be described, is illustrated in the accompanying drawings.

Fig. 4 is an enlarged vertical sectional view of the upper ends of the rams and the controls therefor, and Fig. 5 is a side view of a planing machine having bed, table and standards, the standards being broken away at the upper zone.

Figure 1:
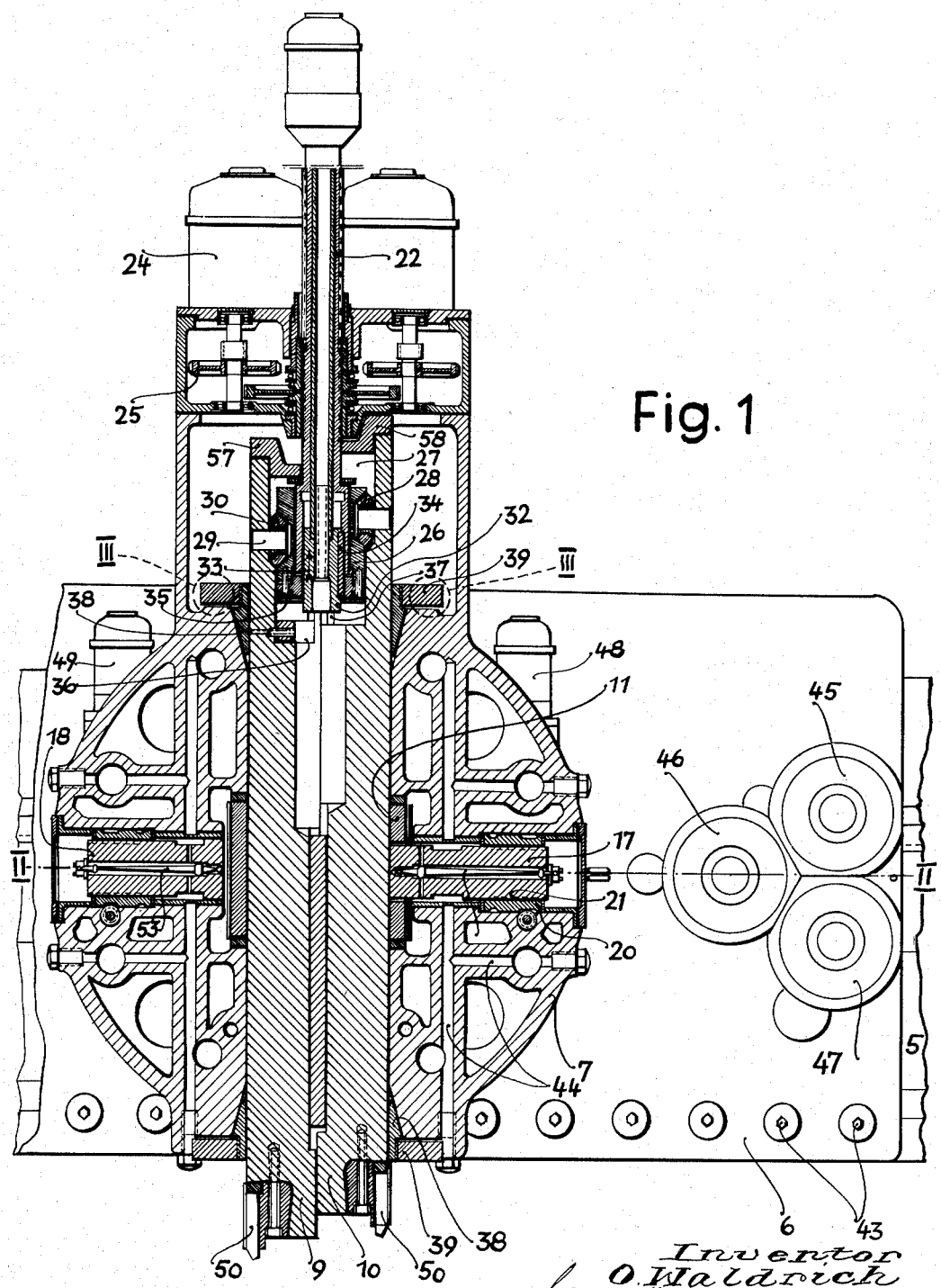
Figure 1 is a longitudinal section through the axis about which the rams are rotated, taken parallel to the face of the tool head.

On the beam 5 of the machine is carried the tool head 6 to which is screwed a lyre-shaped casing 7 which can in known manner be angularly adjusted about a pivot 8. In the casing 7 are two rams 9 and 10 each of semicircular cross section and together completing a full circular section, which are longitudinally slidable and also rotatable about the axis of the circular section. The rams are connected to a toothed ring 11 located desirably at about their midlength by a keyway and feather key 12 as shown particularly in Figure 2. Thus by rotating the ring 11 by means of a pinion 13, the rams can be rotated. An abutment sector 14 is formed in the ring 11 by grooving part of it, and the sector by its end faces 15 and 16 can bear against one of two abutments 17, 18. In the position shown in Figure 2, the abutment 17 is in its operative position while the abutment 18 is withdrawn from its working position. The bearing faces 15 and 16 and the corresponding faces on the abutment are sloped so that by partially withdrawing the abutment the rotation is not, as in the position shown, limited to 180° but is a larger angle than 180°. The retraction of the abutment is effected by a gear 19 which acts upon a threaded bush 20 which by co-operation with a screw thread 21 moves the abutment axially. Rotation of the abutment in the casing 7 is prevented by a keyway and key.

The mean height of the rams 9 and 10 is controlled by a threaded spindle 22 which is axially movable but not rotatable in the casing 7 by the aid of a gear box 23 on the casing. The height adjustment is effected by a motor 24 and gears 25. On the end of the spindle is a sleeve 26 which is located in a bore 27 in the rams and has a cam groove 28 formed in its outer periphery. In this groove engage two rollers 30 on pins 29 carried respectively by the two rams, so that the relative height of the rams is thereby controlled. If now the rams are rotated through the ring 11 their relative vertical positions change in accordance with the shape of the cam groove 28, so that with the parts in the position shown in the drawing (Figure 1) the right hand ram 10 is always in its raised non-working position and the left hand ram is in the lower working position.

Inside the spindle 22 is an inner spindle 31 which can move a sleeve 32 which is only movable longitudinally with respect to the spindle 22. In this way a key 34 which couples the spindle 22 to a flange 35 can be brought out of engagement. If the key 34 is disengaged during the following rotation of the rams, a lug 36 on the ram 9 through a counter-lug 37 on the flange 35 carries the sleeve 26 with it and during this rotation the rams merely rotate and do not move axially, thus remaining at their then levels. The key is then re-engaged and it will now be the right hand ram which is in the working position and the left hand ram in the retracted position. At the same time, the abutment 17 will have been retracted and the abutment 18 brought into working position. This change-over enables planing to be effected feeding from left to right whereas in the previous position shown in the drawing, planing was effected with the feed from right to left. After the change-over the spindle 31 is moved to recouple the cam sleeve in its new position by the key 34.

Clamping of the rams is effected in a simple manner by the provision at the upper and lower ends of the bore in the casing for the rams, of two split, tapered sleeves at 38 which are secured by flanges 39 and bolts 40 to the casing. Between the bolts 40 and the flanges springs such as sets of ring springs 41 are interposed. By these springs the sleeves are so tightly drawn up that the rams are rigidly clamped. Around the periphery of the toothed ring 11 in the example four pairs of plungers 42 are arranged which are slidable in the casing and bear with their outer ends on the end faces of the flanges 39. At their inner ends each pair of plungers works in a cylinder. Hydraulic pressure, for example, oil pressure, is supplied to these cylinders at the appropriate times, into the gaps between the ends of the plunger which presses the plungers apart and against the flanges 39 compressing the springs 41 and allowing the split sleeves 38 to loosen by their own elasticity. In Fig. 1, the bores extending outwardly respecting the inner hydraulic system are only illustrated changed by plugs closing the openings. The rams are therefore released when the hydraulic pressure is applied. This pressure can be supplied in known fashion by a pump actuated by the gearing which operates the rams or by the bed or some other similar means.

The other clamping actions, in particular between the tool head and the beam can be operated in a similar manner to that for the split conical sleeves for clamping the rams. Here a row of screws 43 with packets of springs are provided, similar to the screws 40, and hydraulic pressure is similarly applied in this case to the screw heads, the springs are compressed and the tool head is released. The screws for holding the casing 7 to the tool head are arranged in exactly corresponding manner. The bores 44 constitute the oil-ducts to the cylinder which release the clamping pressure. This clamping of the casing as a rule does not need to be released after every working stroke of the table, whereas in horizontal planing the tool head has to be released each time; in vertical planing the head also can remain clamped the whole time. Motors 45 and 46 serve for moving the tool head slowly and rapidly respectively, and a motor 47 for operating the hydraulic releasing devices, while motors 48 and 49 serve for moving the abutment 17, 18. The operation of the motors may be controlled by a simple circuit actuated manually by the actuation of a push button. It is to be understood that there are three tools 50 held on the outer side of each ram, the tools being exactly one behind another in Figure 1 so that to effect staggering of them in relation to the direction of movement of the table, the abutment 17 must just be adjusted.

Figure 2:
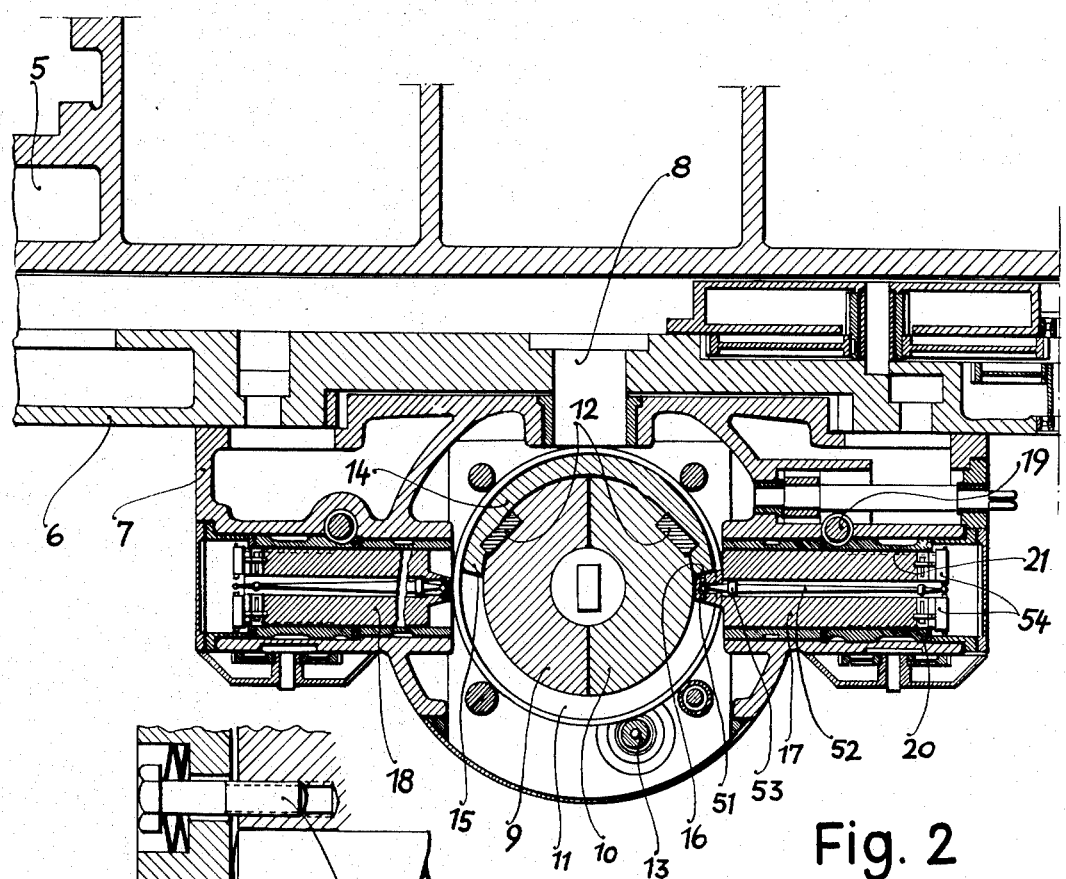
Figure 2 is a cross section on the line II—II of Figure 1 on an enlarged scale.
Figure 3:
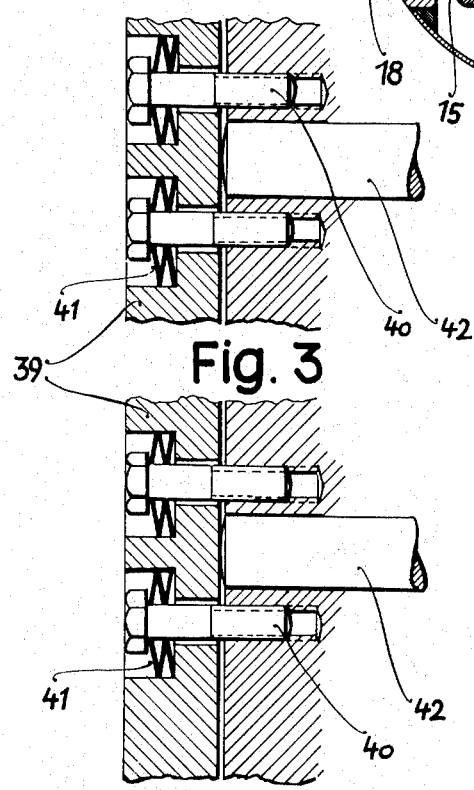
Figure 3 is a fragmental sectional view on an enlarged scale of the area enclosed in the dotted circle identified III in Fig. 1.

Figure 2 also shows that just before the bearing surface 15 or 16 and the abutment 17 come into contact, the corresponding one of two balls 51 projecting from a bore leading into the surface of the abutment is pressed inwards and thus deflects a lever 52 fulcrumed at 53 in a bore in the abutment and thereby closes an electric contact at 54 which controls the motor for driving the table so that the motor can only run when the ring 11 is against the abutment. These contacts may also control the motor 24 for rotating the ring 11. The clamping of the beam to the columns of the machine is equally indispensable with the clamping of all the other parts above described, and can be effected by similar arrangements.

Particular attention is directed to the means for exactly adjusting the height of the tool, as shown in Figure 1 and also on an enlarged scale in Figure 4. Even with no provision beyond that above described, sufficient accuracy is obtained to enable the main work, namely roughing, to be effected without difficulty. If however the machine according to the invention is to be used for finishing cuts of the highest accuracy, care must be taken that the tools always come into exact position. This may be achieved by providing the rams 9, 10 with abutments coacting with the spindle 22. In the present example, the spindle 22 has a collar 55 which is increased in effective diameter by an abutment ring 56. The rams 9 and 10 are provided with cover flanges 57 and 58 which are bolted to their upper ends, and are semicircular in plan so that when together they form a complete closure for the bore 27 in the rams. The lower edges 59 of these cover flanges, when the respective tools are in their lowest position, shown for the ram 9, abut against the ring 56. Exact positioning is ensured in this way.

As an extra assurance, this abutment may be effected under pressure. This is effected in the example by making the cam sleeve 26 movable along the spindle 22. If now the cam sleeve is provided on its under side with a collar, which can be in one piece with the sleeve but in the drawing is shown as a separate flange 60, and spring means are interposed acting between the collar and the sleeve, the sleeve can yield upwards. If therefore the cam 28 is so shaped that before the lower dead point for the pin 29 and roller 30 is reached, the lower flange 57 abuts the ring 56, the upper surface 61 of the cam will press from above against the roller 30 and ensure the abutment of the cover flange against the ring 56 under pressure, which in this instance is exerted by a packet of springs 62 provided behind the heads 63 of the screws 64 connecting the flange 60 to the sleeve 26. With reference to Fig. 5, X denotes the movable table, Y the standards and A and B two adjustable end control switches. The switches A and B cooperate with contacts D and E of electric switch C at the end of each stroke to thus interrupt the circuits which function to drive the several motors and thereby effect the operation of the oil pressure system. While the operation of the machine is believed apparent from the foregoing description, it may be summarized as follows:

The two tool carrying ram sections which move in the general direction of the tool shank are moved alternately one section away from and the other section toward the work piece. Thus, the ram section being advanced toward the work piece holds the tool carried thereby in the working position. At the end of each working stroke of the table, there is a reversal of the position of the two ram sections, and simultaneously, the two sections are turned 180° about a longitudinal axis. As the tools are secured laterally to the ram sections, the tool for one direction of movement of the table, after the rotation, occupies the same position as the tool which functioned during the previous direction of movement of the table, except that the tool faces in the opposite direction.

Each of the ram sections 9 and 10 is semicircular and when the planar faces of the sections are in facial contact, there is defined a ram assembly of circular form which is rotatable about the longitudinal axis of the assembly. The cam follower on each section engages a cam groove 28 in the sleeve 26 which is adjustable axially in the bore of the ram assembly but which is not rotatable. Hence, when the ram sections are turned by the ring 11, the relative vertical positions of the ram sections will change in accordance with the configuration of the groove 28.

To enable the ram sections to turn at a particular level and not move axially, the key 34 is disengaged and, assuming that the ram section 10 is in the non-working position, upon the re-engagement of the key 34, the ram section 9 will be in working position while the ram section 10 is in the non-working position. At the same time, the abutment 17 has been retracted and the abutment 18 moved into the operative position.

By virtue of this arrangement, planing may be effected during feeding from left to right as well as right to left, and after the change-over, the spindle 31 is moved to recouple the cam sleeve in the new position by the key 34.

I claim:

1. In a planing machine including a movable table and a tool head means moving the table in both directions in relation to the tool head, and switch means controlling each stroke of the table, the combination of two rams each carrying at least one tool and movable longitudinally, means acting between the strokes of the table advancing one ram towards the table and retracting the other ram away from the table and at the same time rotating the two rams about a longitudinal axis through an angle of the order of 180° whereby apart from cross feed, the tools on the two rams are interchanged in a working position the same for both but with the tools facing oppositely respectively and means for automatically firmly clamping the rams in the tool head during the working strokes.

2. A planing machine as set forth in claim 1 in which the angle of rotation is 180° and each ram carries one tool.

3. In a planing machine including a movable table and a tool head means moving the table in both directions in relation to the tool head, and switch means controlling each stroke of the table the combination of two rams supported by the tool head for sliding longitudinal movement towards and away from the table, each of said rams being of semicircular section and mounted side by side to define a ram assembly of circular section and being rotatable as a whole about the longitudinal axis of the assembly, a cam sleeve axially adjustable but not normally rotatable located in a bore in the ram assembly, cam followers on said rams engaging a cam groove in said sleeve to be moved longitudinally in opposite directions as they rotate, a toothed ring engaging said rams slidably but not relatively rotatably, means for rotating said ring, bearing surfaces formed on said ring, and an abutment mounted in the tool head in the path of said bearing surfaces thereby to limit the rotation of the ring to an angle of the order of 180°.

4. A planing machine as set forth in claim 3 in which said abutment and the surfaces of said bearings are sloped whereby the precise angle of rotation of said ring can be varied by radial adjustment of said abutment.

5. A planing machine as set forth in claim 3 also comprising split taper sleeves in corresponding seatings and embracing said rams at opposite ends of a bore in which they are rotatable, spring means urging said sleeves into the seatings thereby to clamp said rams, and hydraulic means for relieving said sleeves from the action of the spring means to release said rams for their movements.

6. A planing machine as set forth in claim 3 comprising a casing secured to the tool head having a bore in which said rams are slidable and rotatable, a split taper sleeve in a corresponding seating at each end of the bore and embracing said rams, a flange engaging each sleeve, screws retaining each flange to said casing, sets of springs between the heads of the screws and the flanges thereby to press the sleeves into their seating and clamp said rams, hydraulic cylinders in said casing, plungers in said cylinders engaging said flanges in opposition to said springs, and means for supplying liquid under pressure to said cylinders thereby to cause said plungers to move said flanges against said springs to release said sleeves.

7. A planing machine as set forth in claim 3 also comprising means normally locking said cam sleeve against rotation and movable to release said cam sleeve to permit rotation thereof, means carried by one of said rams and said sleeve whereby when said sleeve has been released, said sleeve can be rotated with said ram and then relocked.

8. A planing machine as set forth in claim 7 comprising two opposite abutments either of which can be moved into the path of said bearing surfaces while the other is retracted.

9. A planing machine as set forth in claim 3 comprising a screw spindle carrying said cam sleeve, an axially movable inner spindle within said screw spindle, and key means for locking said screw spindle against rotation engageable and disengageable by axial movement of said inner spindle.

10. A planing machine as set forth in claim 3 also comprising a spindle carrying said cam sleeve, spring means normally urging said sleeve against a stop in a definite end position on said spindle in a direction towards the work table, a flange on the outer end of each ram, a stop on said spindle against which the flange on the forwardly moved ram abuts just before the movement due to the cam is completed so that the completion of the movement is effected by yielding of the cam against the spring means.

References Cited in the file of this patent

UNITED STATES PATENTS

| | | |
|---|---|---|
| 934,078 | Kuwada | Sept. 14, 1909 |
| 1,586,197 | Heckman | May 25, 1926 |
| 2,252,655 | Young | Aug. 12, 1941 |
| 2,475,577 | Berthiez | July 5, 1949 |